(12) United States Patent
Taulbee

(10) Patent No.: US 8,753,410 B2
(45) Date of Patent: Jun. 17, 2014

(54) METHOD FOR PRODUCING FUEL BRIQUETTES FROM HIGH MOISTURE FINE COAL OR BLENDS OF HIGH MOISTURE FINE COAL AND BIOMASS

(75) Inventor: Darrell Neal Taulbee, Frankfort, KY (US)

(73) Assignee: University of Kentucky Research Foundation, Lexington, KY (US)

(*) Notice: Subject to any disclaimer, the term of this patent is extended or adjusted under 35 U.S.C. 154(b) by 86 days.

(21) Appl. No.: 13/596,572

(22) Filed: Aug. 28, 2012

(65) Prior Publication Data

US 2012/0317878 A1 Dec. 20, 2012

Related U.S. Application Data

(63) Continuation-in-part of application No. 12/704,895, filed on Feb. 12, 2010, now abandoned.

(60) Provisional application No. 61/153,087, filed on Feb. 17, 2009.

(51) Int. Cl.
  *C10L 5/06* (2006.01)
  *C10L 5/10* (2006.01)
  *C10L 5/14* (2006.01)
  *C10L 5/34* (2006.01)
  *C10L 5/38* (2006.01)

(52) U.S. Cl.
  USPC .......... 44/593; 44/595; 44/606; 44/550; 44/589; 44/590

(58) Field of Classification Search
  CPC .................................. C10L 2250/06
  See application file for complete search history.

(56) References Cited

U.S. PATENT DOCUMENTS

| | | | |
|---|---|---|---|
| 857,417 A | 6/1907 | Shedlock | |
| 1,481,627 A | 1/1924 | Smith | |
| 1,650,495 A | 11/1927 | Damon | |
| 4,360,487 A | 11/1982 | Janusch | |
| 4,415,445 A * | 11/1983 | Van Hattem et al. | 209/5 |
| 4,459,762 A | 7/1984 | Hardesty et al. | |
| 4,601,728 A | 7/1986 | Dungs et al. | |

(Continued)

FOREIGN PATENT DOCUMENTS

| | | |
|---|---|---|
| GB | 616857 | 9/1946 |
| GB | 0616857 * | 9/1946 |
| ZA | 20060615 A | 1/2008 |
| ZA | 200606015 A * | 1/2008 |

OTHER PUBLICATIONS

"Briwuetting of Coal Fines and Sawdust Part 1: Binder and Briquetting—Parameters Evaluations" by D. Taulbee D.P. Patil Rick Q Honaker BK Parekh, International Journal of Coal Preparation and Utilization available online Feb. 9, 2009.*

(Continued)

*Primary Examiner* — Pamela H Weiss
(74) *Attorney, Agent, or Firm* — King & Schickli, PLLC

(57) ABSTRACT

An apparatus and method are provided for producing fuel briquettes from high moisture fine coal. The apparatus includes a coal fine pelletizer, a pellet dryer and a fuel briquette former all provided in-line for the efficient production of fuel briquettes. The method comprises forming pellets from coal fines, drying those pellets to a desired moisture content of about 1 to about 10% and forming fuel briquettes from the dried pellets.

28 Claims, 2 Drawing Sheets

(56) References Cited

U.S. PATENT DOCUMENTS

| | | | |
|---|---|---|---|
| 4,618,347 A * | 10/1986 | Watt et al. | 44/558 |
| 4,828,573 A * | 5/1989 | Jelks | 44/577 |
| 5,087,269 A | 2/1992 | Cha et al. | |
| 5,238,629 A | 8/1993 | Davidson | |
| 5,411,560 A | 5/1995 | Mainwaring et al. | |
| 5,453,103 A | 9/1995 | Ford | |
| 5,762,656 A * | 6/1998 | Burke et al. | 44/589 |
| 5,916,826 A | 6/1999 | White | |
| 6,156,083 A | 12/2000 | Dial | |
| 6,530,966 B1 | 3/2003 | Kriech et al. | |
| 2007/0251143 A1 | 11/2007 | Michalek et al. | |
| 2008/0022586 A1 | 1/2008 | Gilbert et al. | |
| 2009/0119981 A1 * | 5/2009 | Drozd et al. | 44/544 |

OTHER PUBLICATIONS

D. Taulbee et al.; "Briquetting of Coal Fines and Sawdust Part 1: Binder and Briquetting—Parameters Evaluations"; International Journal of Coal Preparation and Utilization (2009), vol. 29, pp. 1-22.

* cited by examiner

US 8,753,410 B2

METHOD FOR PRODUCING FUEL BRIQUETTES FROM HIGH MOISTURE FINE COAL OR BLENDS OF HIGH MOISTURE FINE COAL AND BIOMASS

This application is a continuation-in-part of U.S. patent application Ser. No. 12/704,895, filed on 12 Feb. 2010, which claims priority to U.S. Provisional Patent Application Ser. No. 61/153,087, filed on 17 Feb. 2009, the entire disclosures of which are incorporated herein by reference.

TECHNICAL FIELD

The present invention relates generally to fuel products and a process for making the same from coal fines.

BACKGROUND OF THE INVENTION

The commercial briquetting of the fine coal that is typically discarded from a coal-preparation plant is hindered by its high and difficult to remove moisture content. When attempting to form briquettes directly from this material, the poor flow properties of the high-moisture coal fines dictates a relatively slow production rate as well as inconsistencies in the briquetter feed rate and frequent run stoppages. This equates to increased operating costs and variable briquette quality. Further, the briquettes produced without the addition of a cost-prohibitive amount of binder have low green strengths requiring that they be cured before they are suitable for handling and transport.

Thermal drying of a fine coal prior to briquetting solves these problems but such a drying step is both expensive and problematic. The current method of choice for drying wet coal fines is a fluidized bed dryer. However, such units are potentially dangerous and can be difficult to permit when applied to a combustible material such as coal fines as thermal drying can generate an explosive dust that is difficult to contain. Alternate methods of thermal drying, i.e. a conveyed or static bed, are inefficient and suffer to a lesser degree from the same safety and dust containment concerns. Drying at ambient temperatures is not commercially practical due to a prohibitively low rate of evaporation of the moisture from a bulk sample of wet fine coal.

The present invention addresses and solves these problems allowing the production of high-quality, low-moisture briquettes from high-moisture fine coal, such as that discarded in the waste-stream slurry at a coal preparation plant, or from blends of wet fine coal and biomass in a manner that is less expensive and safer than current technologies.

SUMMARY OF THE INVENTION

In accordance with the purposes and objectives of the present invention, a method of producing fuel briquettes from high moisture fine coal is provided. The method comprises the steps of forming pellets from coal fines wherein the pellets have an average weight of between about 2.0 and about 50.0 grams and an average exterior surface area of between about 0.1 and about 50 cm$^2$, drying those pellets to a moisture content of between about 1.0 and about 10% and forming fuel briquettes from the dried pellets. The method may further include adding between about 1.0 and about 15 weight percent binder to the coal fines before forming the pellets. Further the method may include adding between about 2.0 and about 30.0 weight percent biomass to the coal fines prior to forming the pellets. In yet another alternative embodiment the binder and/or the biomass is added prior to forming the fuel briquettes from the dried pellets.

In accordance with an additional aspect of the present invention a method is provided for producing fuel briquettes from preformed pellets including coal fines. That method comprises adding a binder to the preformed pellets and forming the pellets into fuel briquettes.

In still another alternative method of the present invention, fuel briquettes are formed from preformed coal fine pellets by adding biomass to the preformed pellets and then forming the pellets into fuel briquettes.

In accordance with still another aspect of the present invention a fuel briquette processing apparatus is provided comprising a coal fine pelletizer, a pellet dryer and a fuel briquette former wherein the pelletizer, dryer and former are all provided in-line for efficient production of the fuel briquettes.

In accordance with yet another aspect of the present invention a pelletized fuel product is provided. The pelletized fuel product comprises a pellet made from between about 98.0 and about 70.0 weight percent coal fines and between about 2.0 and about 30.0 weight percent biomass. In one particularly useful embodiment the pelletized fuel product comprises a pellet made from between about 97.0 and about 55.0 weight percent coal fines, between about 2.0 and about 30.0 weight percent biomass and between about 1.0 and about 15.0 weight percent binder.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Reference will now be made in detail to the present preferred embodiment of the invention, examples of which are illustrated in the accompanying drawings.

DETAILED DESCRIPTION OF THE PREFERRED EMBODIMENTS OF THE INVENTION

Figure 1:
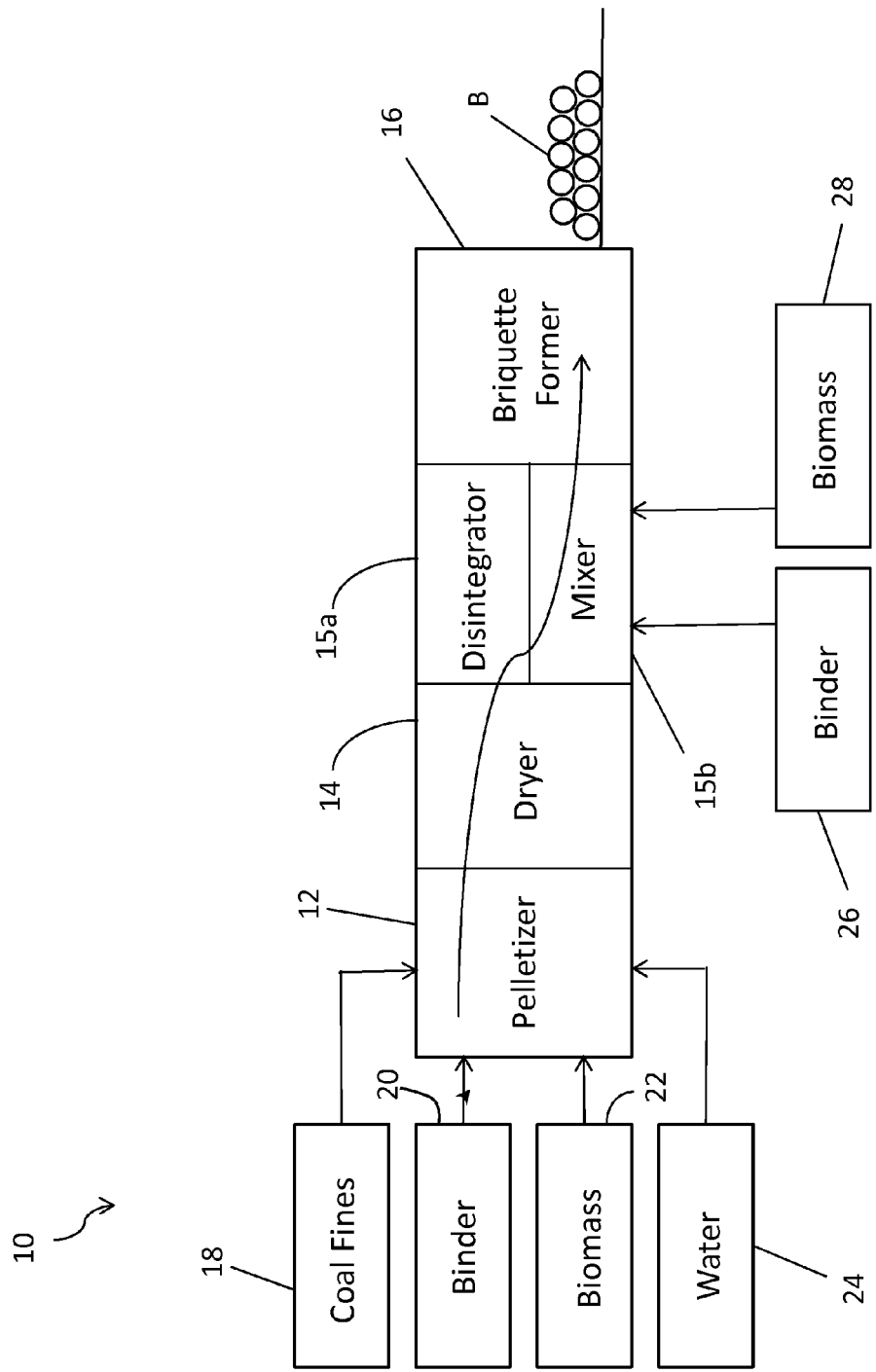
FIG. 1 is a schematical block diagram of a fuel briquette processing apparatus constructed in accordance with the teachings of the present invention.
Figure 2A:
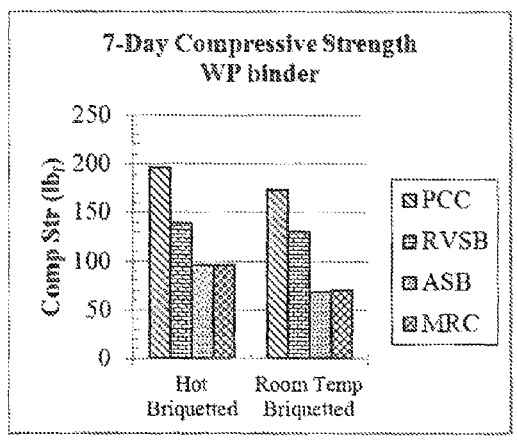
FIGS. 2a-2d are bar graphs illustrating the 7-day compressive strength of briquettes made from hot pellets prepared from various coal fine and binder combinations that were dried at a temperature of 200° C. and immediately briquetted at temperatures ranging from approximately 80° C. to 200° C. compared to briquettes made from otherwise identical pellets that were cooled to room temperature prior to briquetting.
Figure 2B:
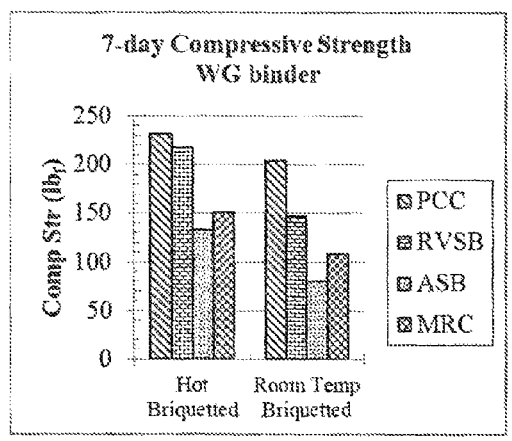
Figure 2C:
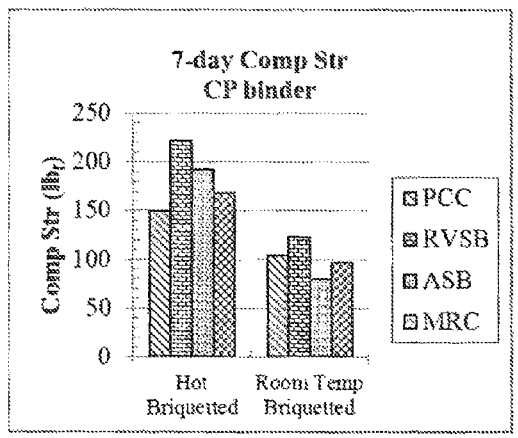
Figure 2D:
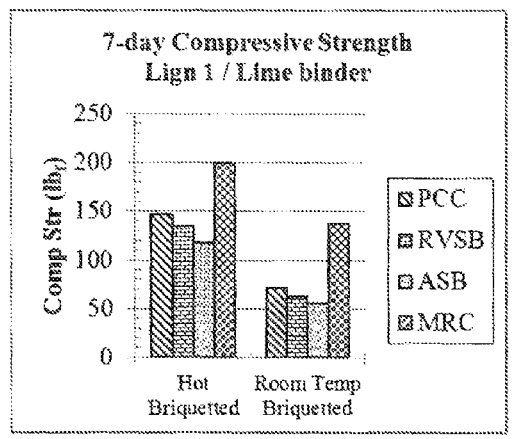

The present invention relates to a method and apparatus 10 for producing fuel briquettes from high moisture fine coal. As best illustrated in FIG. 1, the apparatus may be generally described as comprising a coal fine pelletizer 12, a pellet dryer 14 and a briquette former 16 all provided in-line for efficient production of the fuel briquettes B. The coal fine pelletizer 12 may take the form of substantially any type of pelletizer known in the art including, for example, a disk pelletizer, a pan pelletizer, a pin pelletizer, a drum roller, a rotary pelletizer and an extruder. The pellet dryer 14 may, for example, comprise a conveyed-bed dryer, a moving-bed dryer, a fixed-bed dryer, a moving-bed forced air dryer, a fixed-bed forced air dryer, an ambient air dryer, a moving-bed flue-gas dryer and a fixed-bed flue-gas dryer. The briquette former 16 may take the form of substantially any appropriate briquette forming device including, for example, a continuous-roller briquetter, a ram briquetter, a piston briquetter and an extruder.

The method of producing fuel briquettes B from high moisture fine coal may be broadly described as comprising the steps of forming pellets from coal fines wherein the pellets have an average weight of between about 2.0 and about 50.0 grams and an average exterior surface area of between about 0.1 and about 50 cm$^2$, drying those pellets to a moisture content of between about 1.0 and about 10.0% and forming fuel briquettes B from the dried pellets. Thus, as illustrated in FIG. 1 coal fines are added to the pelletizer 12 from the coal fine supply source 18 which may comprise a bin or the like. Coal fines useful in the present method include fines produced during mining and crushing at the mine site or during coal cleaning operations at a coal-preparation plant. Typically the coal fines are produced from bituminous or anthracite rank coals. It should be appreciated, however, that any coal fines suitable for the steam-, metallurgical-, coking-, ferrosilicate- and stoker-coal markets may be used. The coal fines are recovered in an operating preparation plant from for example, spiral, froth-floatation, cyclone or dense media cleaning circuits, from decanters or filtration units that are used to reduce their moisture content or from slurry impediments, gob piles, or other such storage or disposal sites. Coal fines smaller than about 1 mm are most appropriate for the current process but coal particles up to about ¼ inch in diameter may be utilized. Where necessary larger coal fines may be ground to a suitable smaller size.

The moisture content of the coal fines or "high moisture fine coal" is a function of the average coal particle size, ash content, and the method of storage or recovery and may range widely generally from about 10 to about 50% moisture.

High moisture fine coal includes very fine coal particles as small as minus 325 mesh, which may include up to about 45-50% moisture without separating into a solid and liquid layer, to larger particle fines of perhaps minus 16 mesh which may include up to about 20-25% moisture without separating into a liquid and solid layer. Where the high moisture fine coal includes too much moisture to form pellets, moisture content may be reduced via air drying or other means.

Where appropriate, an optional binder may be added to and mixed with the coal fines in the pelletizer 12. Thus, as illustrated in FIG. 1 a binder may be added from the binder supply source 20. Typically, the binder is added at between about 1.0 and about 15.0 weight percent of the total material added to the pelletizer 12. Binders useful in the present invention include, but are not limited to, lignin, a lignin and asphalt emulsion, wheat starch, lignosulfonate, tall oil, coal tar, polyvinyl alcohol, phenolic resin, paper sludge, a molasses and lime mixture, gaur gum, polymer material, plastics, and mixtures thereof.

In one possible embodiment, green or dried raw biomass may be added to the pelletizer 12 from the biomass supply source 22. When the optional biomass is added, it is done so as to comprise between about 2.0 and about 30.0 weight percent of the total material added to the pelletizer 12. Appropriate biomass materials useful in the present invention include, but are not limited to, switch grass, miscanthus, sawdust, wood flour, fescue, weeds, processed sorghum, corn stover, lignosulfonate, wheat straw, tall oil, paper sludge, extracted molasses and mixtures thereof. Where appropriate, additional water may be added to the material placed in the pelletizer from the water source 24. This is done when additional water is necessary to encourage pellet nucleation and growth. Generally, the moisture content of the coal fines, optional binder and optional biomass material being processed into pellets is on the order of between about 2 and about 50 percent.

While drawing FIG. 1 is illustrated showing coal fines, binder, biomass and water all being added to the pelletizer 12, it should be appreciated that binder addition, biomass addition and water addition are all optional. Thus, coal fines, having an appropriate moisture content, may be the only material added to the pelletizer 12 for certain applications. Once the material is pelletized in the pelletizer 12, it is immediately conveyed in-line to a dryer 14. The pellets are dried in the dryer 14 to a moisture content of between about 1.0 and about 10.0%. One particularly useful drying apparatus 14 is a conveyed-bed dryer wherein ambient-temperature air, heated air or other hot-gas stream such as flue-gas is passed through the pellet bed. The pellets, unlike the coal fines, are more amenable to moisture reduction with little or no dust formation. This is due to the nature of the pellets which (a) resist becoming entrained in the air or gas stream while (b) permitting the moisture to migrate relatively short distances to the pellet surface. There the moisture can be readily evaporated and removed by the flowing air or a heated gas stream that is passed through the bed of the pellets.

Here it should be appreciated that the pellets are being formed to allow quick and efficient drying of the coal fines. Toward this end, the pellets are formed with a relatively low density $D_1$, which allows for relatively quick and efficient moisture removal. In order to provide the desired density, the pellets may be formed without compaction: that is, at or near atmospheric pressure. The pellets may be spherical in shape having an average diameter of between about 0.1 and about 5.0 cm. Alternatively, the pellets may be formed in a cylindrical shape having an average diameter of between about 0.1 and about 5.0 cm and lengths of between about 0.1 and about 20.0 cm.

After drying the pellets are delivered in-line to a briquette former 16. The pellets may be the lone material added to the briquette former 16 for briquette formation. Alternatively, optional binder and/or green or dry raw biomass may be added with the pellets to the briquette former 16 from the binder supply source 26 or biomass supply source 28 respectively as desired for any particular application. More specifically, when present, the binder is added so as to comprise approximately 1.0 to approximately 15.0 weight percent of the material added to the briquette former while the biomass is added so as to comprise approximately 2.0 to approximately 30.0 weight percent of the material added to the briquette former. The remainder comprises the coal fines.

In any of these embodiments, the dried pellets are crushed, ground or otherwise disintegrated by a disintegrator 15a into relatively fine particles. These particles are then mixed in a mixer 15b with any binder, biomass or other additives so as to form a relatively homogeneous mixture. In the illustrated embodiment, the disintegrator 15a and mixer 15b are immediately prior to or part of the briquette former 16. For example, a feed auger in the briquette former 16 may crush, grind and disintegrate the pellets while also mixing them with any binder, green or dry raw biomass and/or other additives that might be added to the disintegrated pellets into a homogeneous mixture.

As illustrated in FIGS. 2a-2d, best results are obtained when the briquettes are formed while the ground, crushed or disintegrated pellet material is still hot from the dryer. More specifically, briquettes formed while the pellet material is still hot exhibit significantly higher 7-day compressive strength than briquettes formed with otherwise similar pellet material at room temperature. The data in the bar graphs indicate that this is true for four different samples of coal fines identified as PCC, RVSB, ASB and MRC using four different binders WP, WG, CP and Liggn1/Lime. The preferred briquetting temperature is at least 75° C. and more typically between about 80° C. and about 200° C.

The briquettes are then formed from this homogeneous mixture. Briquettes formed from such a homogeneous mixture have a relatively consistent strength throughout and are better able to withstand subsequent handling while maintaining their integrity. Thus, the briquettes so formed better resist breakage and dust generation.

In one possible embodiment, the briquettes have a relatively high density $D_2$ ($D_2 > D_1$) which provides the briquettes with the desired strength to safely withstand subsequent handling without disintegrating. Thus, the briquettes may be delivered whole to a coal-fired utility boiler for consumption. This reduces product loss, fuel waste and environmental contamination with coal fines and dust. Typically, the briquettes have a density, following processing, that is between about 1% and about 34% greater than the pellets from which the briquettes are made. In one particularly useful embodiment, the briquettes have a density that is at least 10% greater than the pellets from which the briquettes are made. In another, the briquettes have a density that is at least 15% greater than the pellets from which the briquettes are made.

Numerous benefits result from employing the concepts of the present invention. The apparatus and method of the present invention allows one to quickly, safely and efficiently convert high-moisture content coal fines having a low-heating value to produce high quality, low-moisture fuels that behave in an acceptable manner during shipping, handling, and combustion while simultaneously providing significant reductions of flue-gas emissions of $SO_2$ and $NO_x$.

The method also allows one to convert waste biomass into a valuable energy resource on a meaningful scale. Commercial utilization of biomass suffers from a variety of obstacles including low energy density, making transport expensive, as well as significant capital investment needed to utilize biomass directly in existing coal-fired industrial or utility boilers. The high quality fuel briquettes produced from coal fines and biomass using the apparatus and method of the present invention, are characterized by having a reduced moisture content and a high durability. Thus, the briquettes can be transported as a dense, free-flowing solid and then stored, crushed and conveyed for use in existing equipment. Thus, co-briquetting of biomass with cleaned fine waste coal represents a practical and economical means for generating electric power from biomass or for producing a fuel suitable for the stoker coal market. This is of particular significance to the steam and stoker fuel markets which face ever higher costs for low-sulfur coals needed to meet emission standards.

By first forming the coal fines into pellets, it is possible to reduce the moisture contents of the fines in a more efficient and effective manner. The dried pellets display significantly improved handling characteristics as compared to high-moisture content coal fines and thus provide a more consistent feed stream for the production of a higher quality fuel product briquette. While run stoppages are reduced, production speeds are also increased. The pellets may be dried and then transported to another location for downstream production, if desired. Alternatively, the pellets may be processed in-line into fuel briquettes using the apparatus 10.

The pellets and/or briquettes may include any desired binders or biomass material. The apparatus and method allow the efficient production of an engineered fuel product that may not only include biomass materials but additives such as sulfur scavengers to reduce flue-gas emissions during combustion. Sulfur scavengers include alkaline-earth elements, chiefly calcium and magnesium, that are effective to capture sulfur to reduce emissions of sulfur oxides to the atmosphere. The alkaline-earth elements also serve to scavenge arsenic during combustion and thus suppress the release of arsenic to the atmosphere and prevent the poisoning of high-cost catalyst beds downstream of the combustor that serve to reduce emissions of nitrogen oxides. Halogens such as chlorides may also be added to the fuel product to reduce emissions of elemental mercury.

Typically, alkaline-earth elements are added to the fuel product at a molar ratio of about 0.5:1 to 1.5:1 based upon the sulfur content of the fuel product. Thus, typically on a dry basis, the fuel product may incorporate between about 0.25 and about 3 weight percent alkaline-earth elements for sulfur and arsenic scavenging purposes. In contrast, chlorides such as sodium chloride, potassium chloride, and/or calcium chloride, are provided at no more than about 5 ppm or to about 0.05 weight percent of the fuel product.

On a dry basis, the pellets produced by the present invention may include between about 98.0 and about 70.0 weight percent coal fines and between about 2.0 and about 30.0 weight percent biomass. Optionally, the pellets may include between about 1.0 and about 15.0 weight percent binder, between about 0.25 and about 3.0 weight percent alkaline-earth elements and about 0.05 weight percent chlorides. Thus, on a dry basis, the pellets may include between about 51.95 and about 95.95 weight percent coal fines, between about 2.0 and about 30.0 weight percent biomass, between about 1.0 and about 15.0 weight percent binder, between about 0.25 and about 3.0 weight percent alkaline-earth elements and about 0.05 weight percent chlorides.

The foregoing description of the preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

Example 1

A sample of bituminous coal fines that had been cleaned by a combination of spiral cleaning circuits and froth flotation was obtained from the outlet of a decanter dewatering unit at a coal preparation facility. The fine-coal sample had a moisture content of approximately 12 weight percent and a particle diameter of less than approximately 16 mesh. The coal fines were blended with processed sorghum, chopped weeds, extracted molasses, and calcined lime with the latter having a combined weight comprising 20 weight percent of the blend. This blend was formed into spherical pellets having diameters that ranged from about one centimeter to 3 centimeters in an inclined-pan pelletizer with water added during pelletization to encourage pellet nucleation and growth. The pellets were then air dried in a static-bed configuration to approximately 9 weight percent moisture and then briquetted. The fuel briquettes thus formed had an average weight of approximately 4.5 grams, compressive strengths in excess of 100 pounds force, a moisture free heating value of 12,219 Btu/lb, a bulk density of 40.8 lb/ft$^3$, an attrition index of 0.79, and which exhibited resistance to degradation during submersion in water. The briquettes were then burned in an industrial stoker furnace where they were fed and combusted without modification to the furnace and where they exhibited reductions in flue-gas emissions of $NO_x$ and $SO_2$ of 13.8% and 11.1%, respectively, relative to the compliance coal used at that facility.

Example 2

A sample of decanter fines having a moisture content of approximately 15 weight percent and with a nominal particle diameter of less than 28 mesh that had been cleaned by a combination of spiral cleaning circuits and froth flotation was obtained from the outlet of a decanter dewatering unit at a coal preparation facility. Spherical-shaped pellets with diameters ranging from about 0.25 to 1 inches were formed with a blend of the coal fines and a molasses/lime binder in a disk pelletizer with the addition of about 1-2 weight percent water to encourage pellet nucleation and growth. The pellets were then arranged in a fixed-bed configuration at depths of either 1.25, 2.0, or 4 inches and dried by passing a hot-flue gas produced by a kerosene heater through the pellet bed. The initial moisture content of the pellets was approximately 17.5 percent by weight. The entering temperature of the flue gas used to dry the pellets was approximately 215° C. The results in Table 1 show that the pellet moisture was reduced by at least half in all tests in 30 seconds or less and by over 90% for the shallowest bed depth and longer, one-minute residence time.

TABLE 1

Thermal drying of coal pellets made from decanter fines.

| Run no. | Bed Height (cm) | Residence Time (sec) | Flue-Gas Velocity (m/s) | Exit Temperature (° C.) | Ave. Comp Strength (lb$_f$) | Residual Moisture % |
|---|---|---|---|---|---|---|
| 2 | 5.1 | 30 | 2.66 | 67 | 2.12 | 8.12% |
| 3 | 5.1 | 60 | 0.38 | 95 | 1.81 | 6.26% |
| 4 | 3.0 | 20 | 2.28 | nd | 0.92 | 7.11% |
| 5 | 3.0 | 40 | 4.60 | 164 | 1.83 | 1.68% |
| 6 | 3.0 | 60 | 4.95 | 213 | 2.19 | 0.36% |

Example 3

The dried pellets from the tests described in Example 2 were combined and placed into the feed hopper of a Komarek B-100 continuous briquetter where they were blended with about 10 weight percent biomass and briquetted. The feed mechanism of the briquetter uniformly blended the coal fines, binder, and biomass and produced briquettes with average green strengths in excess of 100 pounds force which is considered adequate for immediate handling, storage, and/or transport.

Example 4

Another set of experiments was conducted to obtain an estimate of the rate at which coal pellets can be dried. In these tests, a sample of coal fines with a nominal particle size of 100×325 mesh was cleaned by froth flotation and dewatered to about 20 percent moisture by vacuum filtration. The flotation fines were then pelletized either with or without a binder with water added to encourage pellet nucleation and growth. The resulting pellets were then classified according to diameter. Splits of the 9.53×4.75-mm fraction were stored in a static-bed configuration in a controlled-environmental chamber at 22.2° C. (72° F.) and 70% relative humidity. At timed intervals, portions of the samples were removed and analyzed for residual-moisture content. These tests revealed that the pellets dried relatively quickly, particularly those containing a wheat starch binder in which the moisture content decreased from 24% to 4% in one day under the simulated ambient conditions (Table 2).

TABLE 2

Moisture loss and compressive strength for 4.75-9.5 mm diameter pellets that were formed from a froth-flotation concentrate and cured at 22.2° C., 70% RH.

| | | Residual Pellet Moisture (4.75-9.53 mm) | | | | |
|---|---|---|---|---|---|---|
| Sample no. | Binder ID | 2 hrs (%) | 1 Day (%) | 2 Days (%) | 3 Days (%) | 7 Days (%) |
| 13-44-1 | Wheat starch | 23.7% | 3.7% | 3.3% | 3.4% | 3.2% |
| 13-44-3 | none | 23.5% | 10.6% | 3.9% | 3.0% | 2.8% |

Example 5

A sample of dewatered coal fines recovered by filtering a froth-flotation slurry was blended with either a molasses/lime or a starch binder and varying amounts of sawdust. This blend was then formed into pellets in a pan pelletizer and the pellets stored for seven days under constant conditions of approximately 22° C. and 70% relative humidity. The moisture content of the pelletized sample was measured at two-hours and again at seven days after formation. These data, which are shown in Table 3, reveal extensive losses in pellet moisture with an accompanying increase in the compressive strength as the pellets dried. After curing for seven days at approximately 22° C. and 70% relative humidity, the pellets were placed in to the hopper of a roll briquetter and briquetted without further treatment. The green strengths (i.e., day 0 compressive strengths) of the newly formed briquettes are shown in Table 4 and appear to be sufficient to allow for the briquettes to be immediately shipped and handled.

TABLE 3

Properties and moisture loss data for pellets formed with flotation coal fines, binder, and variable amounts of sawdust.

| Sample no. | Pellet Moisture | | Sawdust % | Binder ID | Attrition Index | Compressive strength | |
|---|---|---|---|---|---|---|---|
| | 2 hrs | Day 7 | | | | 1 Day lb$_f$ | Day 7 lb$_f$ |
| 13-50-1P | 22.8% | 3.4% | — | Mol/Lime | 0.84 | 3.9 | 10.4 |
| 13-50-2P | 25.5% | 4.0% | 5% | Mol/Lime | 0.81 | 2.9 | 7.0 |
| 13-50-4P | 26.7% | 3.9% | 10% | Mol/Lime | 0.65 | 2.4 | 6.7 |

TABLE 3-continued

Properties and moisture loss data for pellets formed with flotation coal fines, binder, and variable amounts of sawdust.

| Sample no. | Pellet Moisture | | Sawdust % | Binder ID | Attrition Index | Compressive strength | |
|---|---|---|---|---|---|---|---|
| | 2 hrs | Day 7 | | | | 1 Day lb$_f$ | Day 7 lb$_f$ |
| 13-50-3P | 28.4% | 5.2% | 20% | Mol/Lime | 0.84 | 1.9 | 7.5 |
| 13-50-5P | 28.9% | 10.3% | 30% | Mol/Lime | 0.83 | 3.0 | 5.8 |
| 13-50-6P | 32.7% | 9.3% | 20% | Starch | 0.95 | 6.5 | 12.5 |

TABLE 4

Properties of briquettes containing varying amounts of sawdust that were made from the pellets shown in Table 3 after the pellets had cured for 7 days at about 22° C.

| Sample no. | Binder ID | Attrition Index | Compressive strength | | | Average briq wt (g) |
|---|---|---|---|---|---|---|
| | | | Day 0 (lb$_f$) | Day 1 (lb$_f$) | Day 7 (lb$_f$) | |
| 13-50-1B | Mol/Lime | 0.77 | 103.1 | 120.1 | 121.3 | 9.79 |
| 13-50-2B | Mol/Lime | 0.81 | 120.6 | 133.9 | 135.2 | 10.26 |
| 13-50-4B | Mol/Lime | 0.76 | 138.8 | 117.6 | 133.0 | 9.97 |
| 13-50-3B | Mol/Lime | 0.72 | 145.0 | 153.8 | 147.7 | 9.78 |
| 13-50-5B | Mol/Lime | 0.69 | 134.3 | 155.5 | 165.2 | 10.12 |
| 13-50-6B | Starch | 0.81 | 64.7 | 124.7 | 147.5 | 9.37 |

What is claimed:

1. A method of producing fuel briquettes from fine coal, comprising:
   forming pellets from coal fines wherein said pellets have an average weight of between about 2.0 and about 50.0 grams and an average exterior surface area of between about 0.1 and about 50 cm$^2$;
   drying said pellets to a moisture content of between about 1.0 and about 10.0%; and then disintegrating said pellets prior to forming a fuel briquette; and
   forming fuel briquettes.

2. The method of claim 1, wherein said pellet forming step includes adding between about 1.0 and about 15.0 weight percent binder.

3. The method of claim 2, including using a binder selected from a group of binder materials consisting of lignin, a lignin and asphalt emulsion, wheat starch, lignosulfonate, tall oil, coal tar, polyvinyl alcohol, phenolic resin, paper sludge, molasses, lime, gaur gum, polymer material and mixtures thereof.

4. The method of claim 1, wherein said pellet forming step includes adding between about 2.0 and about 30.0 weight percent biomass.

5. The method of claim 4, including using a biomass selected from a group of biomass materials consisting of switch grass, micanthus, sawdust, wood flour, fescue, weeds, processed sorghum, lignosulfonate, wheat straw, tall oil, paper sludge, agricultural residue, corn stover, distiller's grain, extracted molasses and mixtures thereof.

6. The method of claim 5, wherein said pellet forming step includes adding between about 1.0 and about 15.0 weight percent binder.

7. The method of claim 6, including using a binder selected from a group of binder materials consisting of lignin, a lignin and asphalt emulsion, wheat starch, lignosulfonate, tall oil, coal tar, polyvinyl alcohol, phenolic resin, paper sludge, a molasses, lime, gaur gum, polymer material and mixtures thereof.

8. The method of claim 1, wherein said pellet forming step includes adding water to encourage pellet nucleation and growth.

9. The method of claim 1, wherein said briquette forming step includes adding between about 1.0 and about 15.0 weight percent binder.

10. The method of claim 9 including mixing said disintegrated pellets and said added binder so as to form a homogenous mixture and forming said briquettes from said mixture.

11. The method of claim 9, wherein said briquette forming step includes adding between about 2.0 to about 30.0 weight percent biomass.

12. The method of claim 11 including mixing said disintegrated pellets with said added binder and biomass so as to form a homogenous mixture and forming said briquettes from said mixture.

13. The method of claim 12 wherein said briquettes are formed while said mixtures is between about 80° C. and about 200° C.

14. The method of claim 11, wherein said binder is selected from a group of binder materials consisting of lignin, a lignin and asphalt emulsion, wheat starch, lignosulfonate, tall oil, coal tar, polyvinyl alcohol, phenolic resin, paper sludge, a molasses and lime mixture, gaur gum, polymer material and mixtures thereof and said biomass is selected from a group of biomass materials consisting of switch grass, miscanthus, sawdust, wood flour, fescue, weeds, processed sorghum, lignosulfonate, wheat straw, tall oil, paper sludge, agricultural residue, corn stover, distillers grain, extracted molasses and mixtures thereof.

15. The method of claim 1, wherein said briquette forming step includes adding between about 2.0 to about 30.0 weight percent biomass.

16. The method of claim 15 including mixing said disintegrated pellets with said added biomass so as to form a homogeneous mixture and forming said briquettes from said mixture.

17. The method of claim 1, wherein said briquette forming step includes making briquettes having an average weight of between about 2.0 and about 100.0 grams and an average exterior surface area of between about 0.2 and about 100 cm$^2$.

18. The method of claim 1, wherein said pellet forming step includes making spherical pellets having an average diameter of between about 0.1 and about 5.0 cm.

19. The method of claim 1, wherein said pellet forming step includes making cylindrical pellets having an average diameter of between about 0.1 and about 5.0 cm and lengths of about 0.1 to about 20.0 cm.

20. The method of claim 1, wherein said drying step comprises forced air drying.

21. The method of claim 1, wherein said drying step comprises forced air drying at ambient temperature.

22. The method of claim 1, wherein said drying step comprises drying with a stream of hot heated gas, heated air or hot flue gas.

23. The method of claim 1, wherein said pellet forming, pellet drying and briquette forming steps are all completed in-line.

24. The method of claim 1, including completing said pellet forming, pellet drying and briquette forming steps at a coal preparation facility.

25. The method of claim 1, including completing said pellet forming, pellet drying and briquette forming steps at a coal fines disposal site.

26. The method of claim 1 including forming said pellets with a density ($D_1$) and forming said briquettes with a density ($D_2$) where $D_2 > D_1$.

27. The method of claim 26 where $D_2$ is at least 10% greater than $D_1$.

28. The method of claim 26 where $D_2$ is at least 15% greater than $D_1$.

\* \* \* \* \*